Dec. 6, 1949     F. L. RUPLEY     2,490,375
PNEUMATIC BORE GAUGING HEAD
Filed Aug. 29, 1946     2 Sheets-Sheet 1
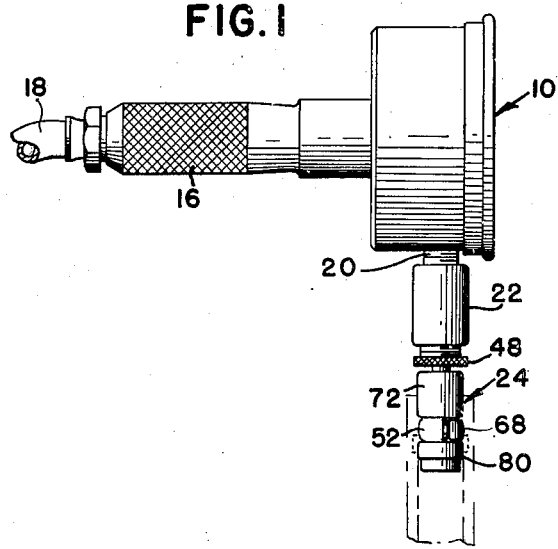
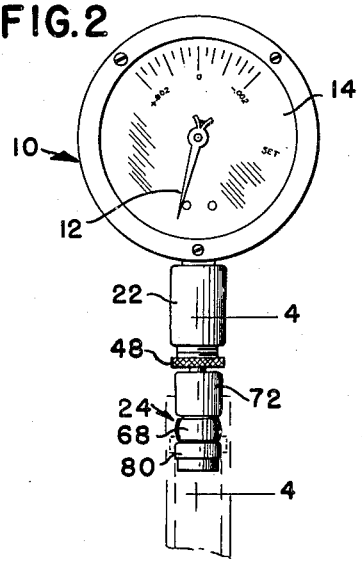
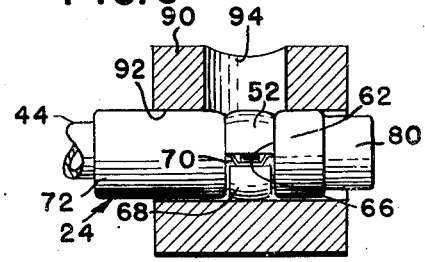
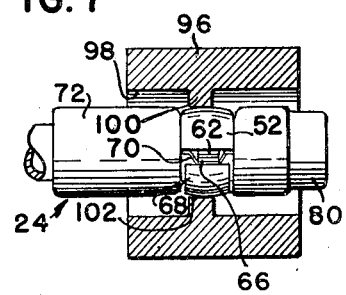
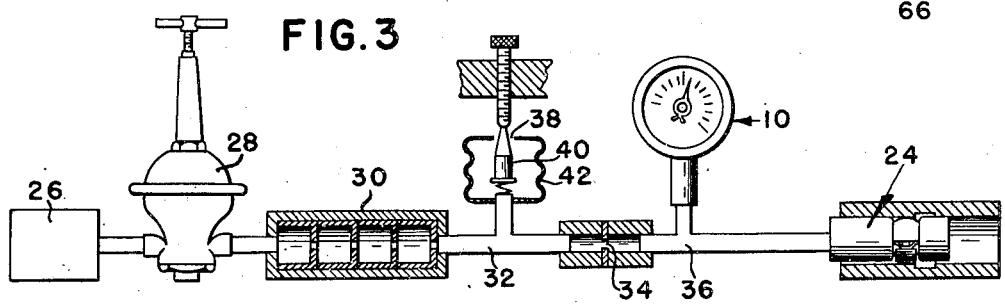
INVENTOR
FREDERICK L. RUPLEY
BY
Toulmin & Toulmin
ATTORNEY Dec. 6, 1949 F. L. RUPLEY 2,490,375
PNEUMATIC BORE GAUGING HEAD
Filed Aug. 29, 1946 2 Sheets-Sheet 2
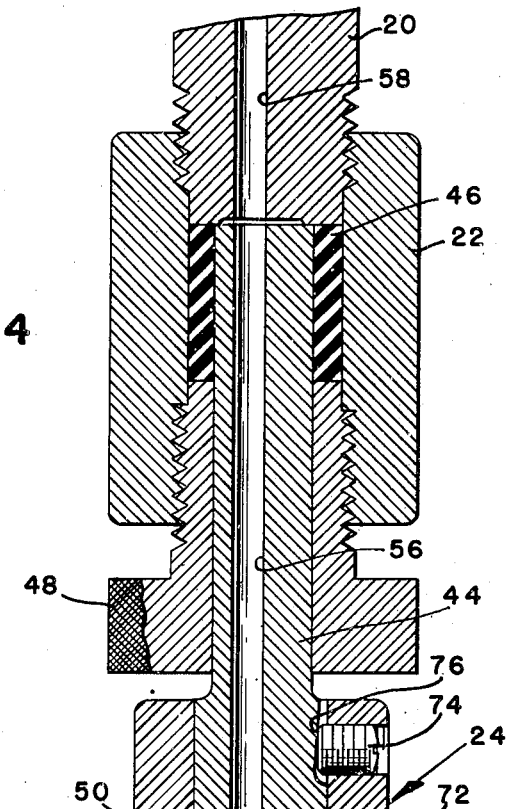
FIG. 4
FIG. 5
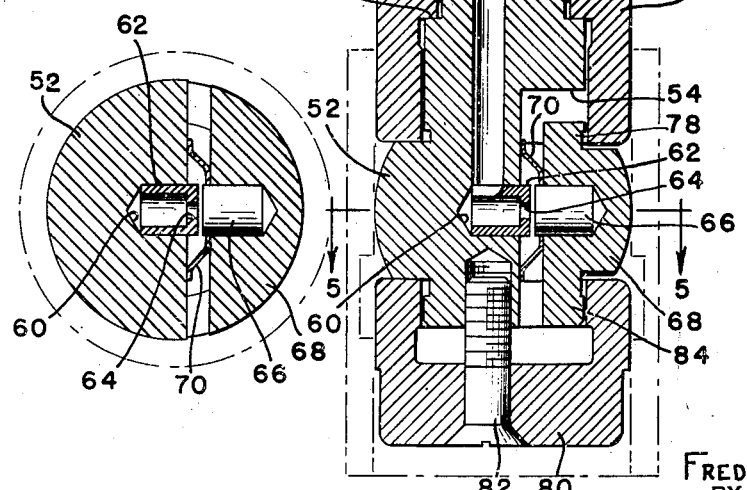
INVENTOR
FREDERICK L. RUPLEY
BY
Toulmin & Toulmin
ATTORNEYS Patented Dec. 6, 1949

2,490,375

UNITED STATES PATENT OFFICE 2,490,375

PNEUMATIC BORE GAUGING HEAD

Frederick L. Rupley, Cincinnati, Ohio, assignor to Merz Engineering Company, Indianapolis, Ind., a corporation of Indiana Application August 29, 1946, Serial No. 693,720

6 Claims. (Cl. 33—178)

This invention relates to measuring or gauging devices and particularly to such devices employing an expansive fluid medium such as compressed air.

In many instances, in the gauging of work members, it is desired to measure a bore which is interrupted by a cross bore, or by an undercut, or by some other depression which interrupts the continuity of the surface of the bore. When the usual type bore gauge is utilized in measuring this kind of bore, the interruption of the bore either makes the reading of the gauge inaccurate, or the gauge catches or "staggers" on the edge of the recess.

In other instances, the bore to be measured may be remotely located in a workpiece so that it is difficult to see if the gauge is properly positioned therein. With the usual type of gauging mechanism such bores are difficult to measure.

Still other workpieces have relatively rough surfaces thereon and an ordinary gauge will not give an average indication of the bore size when such a reading is desired. Other workpieces such as thin tubular members must be measured for both size and straightness and with the ordinary gauging set-up two instruments would be required to make these determinations.

Accordingly, an object is the provision of a gauge head especially adapted for the gauging of interrupted or undercut holes or bores.

Still another object is the provision of a gauge head of an improved design in which the movable portion in engagement with the workpiece comprises of a substantial area.

A further object of the invention consists in the provision of a gauge head for gauging internal bores, which is provided with means for automatically and positively aligning the said gauge head within the bore.

It is also an object to provide a construction for the gauge head which is easily assembled or dismantled and which is rigid when clamped together.

A still further object is the provision of a gauge head which will at one time check the straightness and size of a bore.

These and other objects and advantages will become more apparent upon reference to the following description taken in connection with the attached drawings in which:

Figure 1 is a side elevation showing a typical gauge equipped with the gauging head according to the present invention;

Figure 2 is a front elevation of the gauge of Figure 1;

Figure 3 is a diagrammatic view showing one form of fluid circuit for supplying compressed air to the gauge head;

Figure 4 is an enlarged vertical section through the gauge head and is indicated by the line 4—4 on Figure 2;

Figure 5 is a plan section indicated by the line 5—5 on Figure 4;

Figure 6 is a view showing the gauge head of this invention being utilized in gauging the diameter of a passage at a point where it is interrupted by a cross bore; and Figure 7 is a view similar to Figure 6 but showing how the diameter of a ribbed aperture can be measured by using the spherical mid-portion of the gauge head.

General arrangement

An air gauging system adapted for employing a gauge head according to the present invention comprises a source of supply for air under pressure, suitable means for regulating the pressure of the air supply, and means of limiting the volume of the said supply.

The air at controlled pressure and volume is normally relatively freely exhausted to the atmosphere through a gauging port in the gauging head. When a workpiece is contacted by the gauging head, the effective area of the gauging port is varied so that the flow of fluid therethrough is also varied. This variation in the rate of fluid flow through the gauging head is reflected in a pressure which is indicated on a suitable pressure type instrument.

Heretofore, it has been difficult properly to gauge bores or holes which are interrupted by undercuts, cross-drills or other configurations on which a gauging head would be apt to catch. According to the present invention, the gauging head comprises an elongated cylindrical member which has extending from one side thereof an arcuate button or workpiece engaging member of substantial area which is arranged for directly varying the gauging port.

By using a gauge head of this type, it is possible to insert the gauge head into a bore and to have it aligned therein without the aforementioned undercut or cross drill interfering with the gauging process.

Furthermore, the flow of air through the gauging head is entirely controlled by the displacement of the gauging member by the workpiece so that the aforementioned interruption in the hole does not influence the rate of fluid flow from the gauging head. This insures that the indication of the gauge will be accurate under all circumstances.

Structural arrangement

Referring to the drawings, 10 indicates a pressure responsive instrument which may comprise a Bourdon tube type movement connected to actuate a pointer or indicator 12 in its movements over a graduated face or dial 14.

The instrument 10 may be provided with a handle 16 through which air is supplied to the instrument by the conduit 18 and which may be employed for manually manipulating the device, or for rigidly clamping the instrument in a suitable stationary column.

Extending from the instrument in another direction from the handle or shank 16 is a threaded pipe or nipple 20 which has threaded thereon a coupling 22. The coupling 22 receives in its lower end a gauging head of the present invention which is indicated generally by the reference numeral 24. The compressed air which is supplied to the instrument 10 through the conduit 18 passes through the said instrument and the nipple 20 to the gauging head 24, and variations in the rate of fluid flow through the said gauging head are indicated on the said instrument by the pointer 12.

In Figure 3 there is shown one arrangement for supplying compressed air to the gauging head and instrument. In Figure 3 a source of compressed air is indicated at 26 and is shown as connected through a pressure regulator 28 with a plurality of serially arranged throttling members 30. The discharge of the throttling members 30 is connected by a conduit 32 through a fixed orifice 34 with a conduit 36 which leads to the instrument 10 and the gauging head 24.

The supply of fluid may be further controlled as to pressure by means of the automatically variable bypass port at 38 which is restricted by a valve member 40. In response to increases in pressure in the conduit 32, the expansive bellows 42, within which the said port 38 is formed, expands to move the said port upwardly thereby to reduce the restriction thereof by the member 40. This increased rate of bleed off maintains substantially a constant pressure in the conduit 32. It will be apparent that a drop in pressure in the conduit 32 will provide for a correcting influence in the opposite direction by the port 38 and valve member 40.

It will be understood that there are other means of supplying fluid to the gauging head 24 but that the illustrations in Figure 3 represent one of the better ways of accomplishing this.

Referring to Figures 4 and 5, the construction of the gauging head is more particularly shown. In this view it will be seen that the gauging head comprises the body portion 44 that extends into the coupling 22 and is surrounded therein by a resilient sleeve 46 which is preferably a rubberlike material. The body 44 is also enclosed by a gland 48 which threads into the coupling 22 on the side opposite the nipple 20 and compresses the sleeve 46 in order tightly to grip the end of the body portion 44.

The lower end of the body 44 is shouldered as at 50 and has an arcuate or bulbous projection as at 52 between the said shoulder. The side of the body 44 directly opposite the bulbous portion 52 is notched as indicated at 54. Extending downwardly from the upper end of the body 44 is a bore 56 which registers with a bore 58 in the nipple 20. The lower end of the bore 56 terminates short of the lower end of the body 44 and is intersected by a transverse bore 60 within which there is carried the member 62 which comprises the fixed gauging port 64.

The gauging port 64 is adapted for being variably restricted by a cylindrical part 66 which is carried in a bore in the workpiece engaging member 68 which, similarly to the portion 52 of the body 44, is of a bulbous or spherical configuration. The member 68 has flanges extending upwardly and downwardly therefrom and fits loosely within the notch 54 in the lower end of the body 44. A spring 70 between the member 68 and the body 44 continuously urges the said member toward a position of lesser restriction of the gauging port 64.

The member 68 is retained in position by a collar 72 which encircles the body 54 and sits against the shoulder 50 and which is retained in position by a set screw 74 that bears against the bevel 76 on the said body. The sleeve 72 extends downwardly to engage the upper surface of the portion 52 and also encircles the upper flange 78 of the gauging member 68. The lower end of the gauging member is retained in position by a cup-shaped end cap 80 which is retained on the body 44 by a screw 82. The upper edge of the cap 80 bears against the lower surface of the portion 52 and encircles the lower flange 84 of the member 68. It will be noted that the distance between the upper and lower surfaces of the portion 52 is greater than the distance between the upper and lower surfaces of the member 68 so that the latter is free to move while being retained on the gauging head.

In operation, the assembled gauging head as shown in Figure 4 is inserted into the bore it is desired to measure. With the gauging head inserted in the said bore, the lower end cap 80 and the sleeve 72 form pilot means for guiding the gauging head in its movements and, by being spaced apart, insure that the gauging head and the bore will be in substantial alignment. With the gauging head in alignment with the bore being measured, the diameter thereof is exactly measured by the relative positions of the portion 52 of the body 44 and the gauging member 68. It will be noted that the portion 52 and the member 68 are finished in order to form a portion of a sphere. Thus, any manner of engaging a cylindrical bore with the portion 52 and the member 68 will result in a true indication of the bore size. Thus, while the gauging head is shown as measuring a bore which is undercut, it will be evident that it could be used to measure the diameter of an annular projection within a bore which would ordinarily be inaccessible by ordinary gauging devices. Furthermore, while the pilot portions of the gauge represented by the cap 80 and the sleeve 72 are closely machined and finished in order properly to guide the gauging head in a bore, any workpiece which will engage both the portion 52 and the member 68 will be correctly measured regardless of the said pilots.

By way of illustration of the advantages of a gauging head constructed according to this invention there are shown in Figures 6 and 7 representative workpieces wherein the gauge head of this invention has particular merit.

In Figure 6 the gauging head is used as a mandrel and the workpiece 90 which has a bore 92 therethrough intersected by the large bore 94 is placed on the gauging head. In gauging the bore 92 from end to end, it will be apparent that with the gauge head in the position shown it is necessary to utilize the pilot surfaces on the cap 80 and the sleeve 72 which bear on the side of the bore 92 opposite the member 68 and on each side of the intersecting bore 94. A true indication from end to end of the bore 92 is thus had.

In Figure 7, there is shown a workpiece 96 having a bore 98, and within the bore 98 the inwardly projecting annular flange 100 which defines an aperture 102. It will be noted that the diameter of the aperture 102 is readily determined by the gauging head of this invention and that the correct size of the aperture is indicated irrespective of the angularity of the gauge head in the bore 98 due to the true spherical contour of the portion 52 of the body 44 and the gauging member 68.

It will be understood that the invention is susceptible to modification in order to adapt it to different usages and conditions and, accordingly, it is desired to comprehend such modifications within this invention as may fall within the scope of the appended claims.

I claim:

1. In a gauge head for cylindrical bores; a body portion comprising spaced cylindrical pilots and a partial spherical portion having the same radius as said cylindrical pilots located between said pilots; a workpiece partial spherical gauging member having a spherical surface with a radius substantially equal to said partial spherical portion movably carried on said body directly opposite said partial spherical portion; and yielding means continuously urging said gauging member away from said partial spherical portion.

2. In a head for an air gauge; a body having a flow passage therethrough; spaced cylindrical pilots on said body and an intermediate partial spherical portion having the same radius as said cylindrical pilots formed on said body; a movable gauging member carried on said body directly opposite said spherical portion and forming therewith a substantially continuous convex annulus having a diameter substantially equal to the diameter of said pilots; means carried by said member for restricting said flow passage; and yielding means continuously urging said member toward a position of lesser restriction of said passage.

3. A workpiece engaging head for an air gauge comprising a body portion with a fluid passage therethrough; said body comprising spaced cylindrical pilots and a partial spherical portion between said pilots; a notch in said body located diametrically opposite said partial spherical portion; a gauging member movably mounted in said notch and being of partial spherical configuration so as to form with said partial spherical portion of said body a convex annulus of substantially the same diameter as said cylindrical pilots; a port in said body communicating with said passage and opening directly toward the back of said member whereby movements of said gauging member variably restrict said port; and yielding means continuously urging said member toward a position of lesser restriction of said port.

4. In a head for an air gauge; a body having a partial spherical portion adjacent one end and a notch diametrically opposite said portion; detachable pilot portions receivable on said body to abut opposite sides of said partial spherical portion; and a complementary partial spherical gauging member receivable in said notch and movably retained on said body by said pilot portions so that said partial spherical portion and gauging member present a spherical diameter substantially the same size as the workpiece bore being measured.

5. In a gauge head; an elongated body having a spherical projection adjacent one end and a notch on the side opposite said projection; detachable pilot portions mounted on said body and abutting said projection; a spherical gauging member receivable in said notch directly opposite said projection; and means carried by said member and telescoping with the said pilot portions for loosely retaining said member on said body.

6. In a head for an air gauge; an elongated body having an air flow passage therethrough; a partial spherical projection on said body adjacent one end and a notch opposite said spherical portion; pilot sleeves mounted on said body, means to rigidly secure said sleeves on said body, and cylindrical outside diameters on said sleeves equal to the outermost spherical diameter of said projection; a gauging member movable for variably restricting said passage and comprising a spherical mid-portion and extensions on both ends, said member being received in said notch with the spherical portion exactly opposite said projection and said extensions telescoping with said sleeves.

FREDERICK L. RUPLEY.

REFERENCES CITED

The following references are of record in the file of this patent:

UNITED STATES PATENTS

| Number | Name | Date |
|---|---|---|
| 1,437,053 | Harrington | Nov. 28, 1922 |
| 1,972,124 | Aldeborgh | Sept. 4, 1934 |
| 2,074,753 | McClain | Mar. 23, 1937 |
| 2,139,282 | Poock et al. | Dec. 6, 1938 |
| 2,239,981 | Terry | Apr. 29, 1941 |
| 2,241,287 | Westcott | May 6, 1941 |
| 2,306,469 | Rupley | Dec. 29, 1942 |
| 2,322,343 | Brandon | June 22, 1943 |
| 2,369,319 | Smith | Feb. 13, 1945 |
| 2,375,600 | Wattebot | May 8, 1945 |
| 2,385,157 | Nilsson | Sept. 18, 1945 |